US012707425B2

(12) United States Patent
Wei et al.

(10) Patent No.: US 12,707,425 B2
(45) Date of Patent: Aug. 11, 2026

(54) COMMUNICATIONS DEVICE AND NETWORK INFRASTRUCTURE EQUIPMENT AND METHODS APPLYING MOBILITY INFORMATION OF INFRASTRUCTURE EQUIPMENT

(71) Applicant: Sony Group Corporation, Tokyo (JP)

(72) Inventors: Yuxin Wei, Basingstoke (GB); Samuel Asangbeng Atungsiri, Basingstoke (GB); Vivek Sharma, Basingstoke (GB)

(73) Assignee: Sony Group Corporation, Tokyo (JP)

(*) Notice: Subject to any disclaimer, the term of this patent is extended or adjusted under 35 U.S.C. 154(b) by 335 days.

(21) Appl. No.: 18/031,892

(22) PCT Filed: Oct. 27, 2021

(86) PCT No.: PCT/EP2021/079878
§ 371 (c)(1),
(2) Date: Apr. 14, 2023

(87) PCT Pub. No.: WO2022/096349
PCT Pub. Date: May 12, 2022

(65) Prior Publication Data

US 2023/0403674 A1 Dec. 14, 2023

(30) Foreign Application Priority Data

Nov. 4, 2020 (EP) .................................... 20205789

(51) Int. Cl.
*H04W 64/00* (2009.01)
*H04W 36/32* (2009.01)
(Continued)

(52) U.S. Cl.
CPC ....... *H04W 64/003* (2013.01); *H04W 36/324* (2023.05); *H04W 36/326* (2023.05);
(Continued)

(58) Field of Classification Search
CPC . H04W 36/324; H04W 36/326; H04W 36/36; H04W 48/10; H04W 48/20; H04W 64/003
(Continued)

(56) References Cited

U.S. PATENT DOCUMENTS

2014/0192781 A1* 7/2014 Teyeb .................. H04W 36/34 370/328
2014/0266896 A1* 9/2014 Hyslop ............. H04B 7/18506 342/368
(Continued)

FOREIGN PATENT DOCUMENTS

EP 2882231 A1 6/2015

OTHER PUBLICATIONS

International Search Report and Written Opinion mailed on Mar. 30, 2022, received for PCT Application PCT/EP2021/079878, filed on Oct. 27, 2021, 24 pages.
(Continued)

*Primary Examiner* — Joel Ajayi
(74) *Attorney, Agent, or Firm* — XSENSUS LLP

(57) ABSTRACT

A method of operating a communications device comprises receiving from an infrastructure equipment of a radio network part of the wireless communications mobility information indicating one or both of whether the infrastructure is non-stationary and a location of the infrastructure equipment, and adapting an operation of the communications device in accordance with the mobility information. The adapted operation includes configuring the communications devices for transmitting signals to the infrastructure equipment or receiving signals from the infrastructure equipment according to the mobility information.

18 Claims, 9 Drawing Sheets

(51) Int. Cl.

| | |
|---|---|
| ***H04W 36/36*** | (2009.01) |
| ***H04W 48/10*** | (2009.01) |
| ***H04W 48/20*** | (2009.01) |
| *H04W 36/30* | (2009.01) |

(52) U.S. Cl.
CPC ........... *H04W 36/36* (2013.01); *H04W 48/10* (2013.01); *H04W 48/20* (2013.01); *H04W 36/302* (2023.05)

(58) Field of Classification Search
USPC .......................................................... 455/434
See application file for complete search history.

(56) References Cited

U.S. PATENT DOCUMENTS

| | | | | |
|---|---|---|---|---|
| 2018/0075746 | A1* | 3/2018 | Jiang | G08G 1/096791 |
| 2018/0199328 | A1* | 7/2018 | Sang | H04B 7/0617 |
| 2019/0159102 | A1* | 5/2019 | Ryu | H04W 36/0055 |
| 2019/0369201 | A1* | 12/2019 | Akkarakaran | G01S 5/0236 |
| 2019/0387495 | A1 | 12/2019 | Garg | |

OTHER PUBLICATIONS

3GPP, "NG Radio Access Network (NG-RAN); Stage 2 functional specification of User Equipment (UE) positioning in NG-RAN (Release 15)", 3GPP TS 38.305 V15.5.0, Dec. 2019, pp. 1-72.
3GPP, "Evolved Universal Terrestrial Radio Access (E-UTRA); Radio Resource Control (RRC); Protocol specification (Release 15)", 3GPP TS 36.331 V15.9.0, Mar. 2020, pp. 1-964.
Holma et al., "LTE for UMTS OFDMA and SC-FDMA Based Radio Access", John Wiley & Sons, 2009, pp. 25-27.

* cited by examiner

COMMUNICATIONS DEVICE AND NETWORK INFRASTRUCTURE EQUIPMENT AND METHODS APPLYING MOBILITY INFORMATION OF INFRASTRUCTURE EQUIPMENT

CROSS-REFERENCE TO RELATED APPLICATIONS

The present application is based on PCT filing PCT/EP2021/079878, filed Oct. 27, 2021, which claims the Paris Convention priority to European Patent Application Number 20205789.9, filed Nov. 4, 2020, the contents of each are incorporated herein by reference in their entirety

BACKGROUND

Field

The present disclosure relates to communications devices, network infrastructure equipment, wireless communications networks and methods. Embodiments of the present disclosure can provide improvements in or relating operations performed by communications devices relating to transmitting or receiving signals and data via a wireless communications network in accordance with a mobility status of an infrastructure equipment of the wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Latest generation mobile telecommunication systems are able to support a wider range of services than simple voice and messaging services offered by earlier generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected efficiently to support communications with an ever-increasing range of devices and data traffic profiles than existing systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

To facilitate communications, future mobile communications networks may also be configured with new features and aspects and in turn different types of devices must also be adapted to utilise these new features and aspects.

SUMMARY

Embodiments of the present technique can provide a method of operating by a communications device for transmitting or receiving via a wireless communications network. The method comprises receiving, from an infrastructure equipment of a radio network part of the wireless communications network, mobility information indicating one or both of whether the infrastructure is non-stationary and a location of the infrastructure equipment, and adapting an operation of the communications device in accordance with the mobility information. The adapted operation includes configuring the communications devices for transmitting signals to the infrastructure equipment or receiving signals from the infrastructure equipment according to the mobility information.

Example embodiments envisage that an infrastructure equipment forming part of a radio network of a wireless communications network may be mobile and therefore non-stationary. For example the infrastructure equipment may form part of a backhaul network or may be a drone or other mobile infrastructure equipment forming part of a radio network of a wireless communications network. By transmitting mobility information indicating a mobility status of the infrastructure equipment or its location, a communications device receiving that mobility information from the infrastructure equipment can adapt its operation to communicate more effectively and efficiently via the wireless access interface formed by the wireless communications network. For example, the communications device can adapt an idle mode cell selection/re-selection procedure, a handover procedure and/or a transmit or receive beam direction based on the mobility information.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
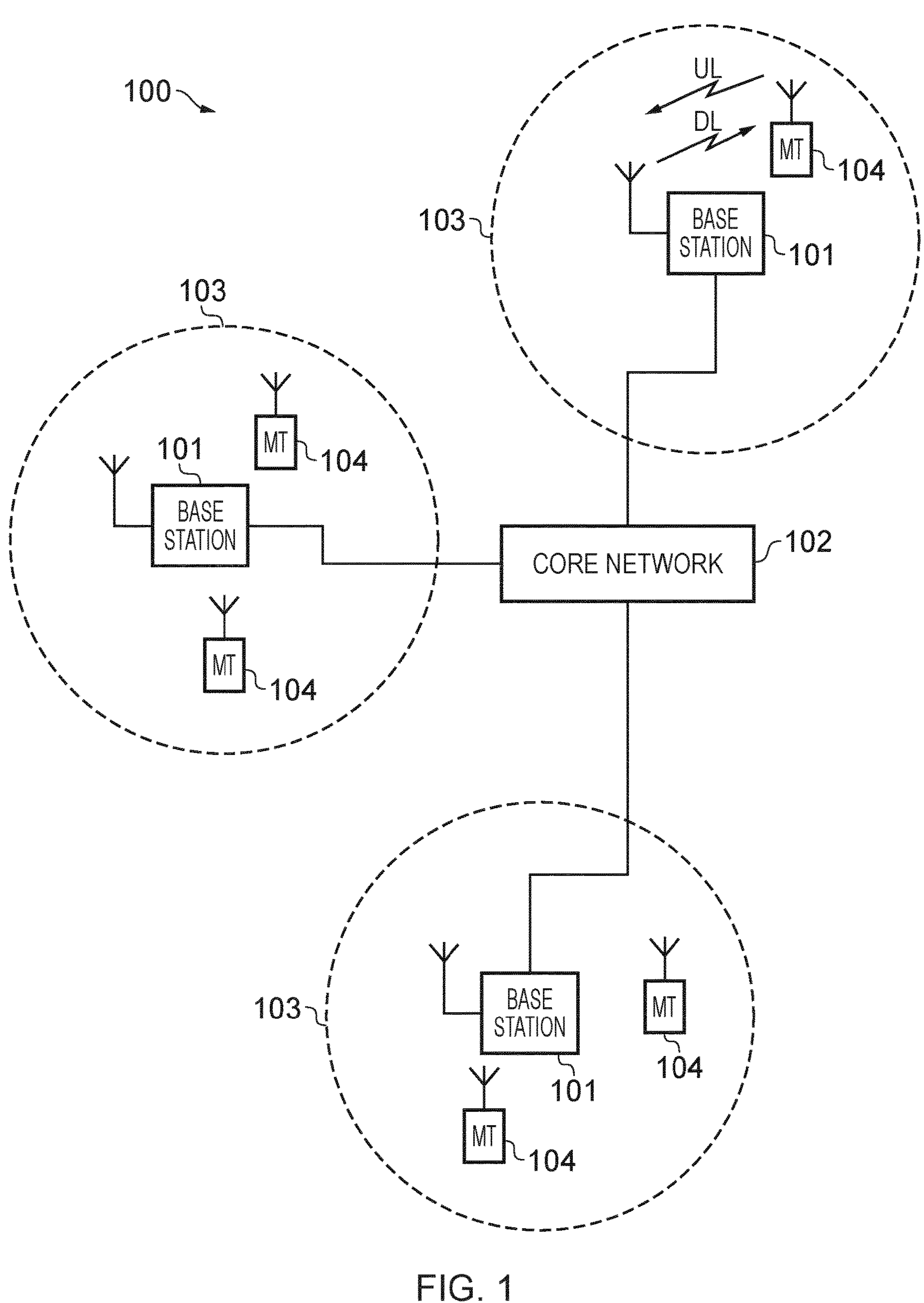
FIG. 1 schematically represents some aspects of an LTE-type wireless telecommunication network, which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink (DL). Data is transmitted from terminal devices 104 to the base stations 101 via a radio uplink (UL). The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
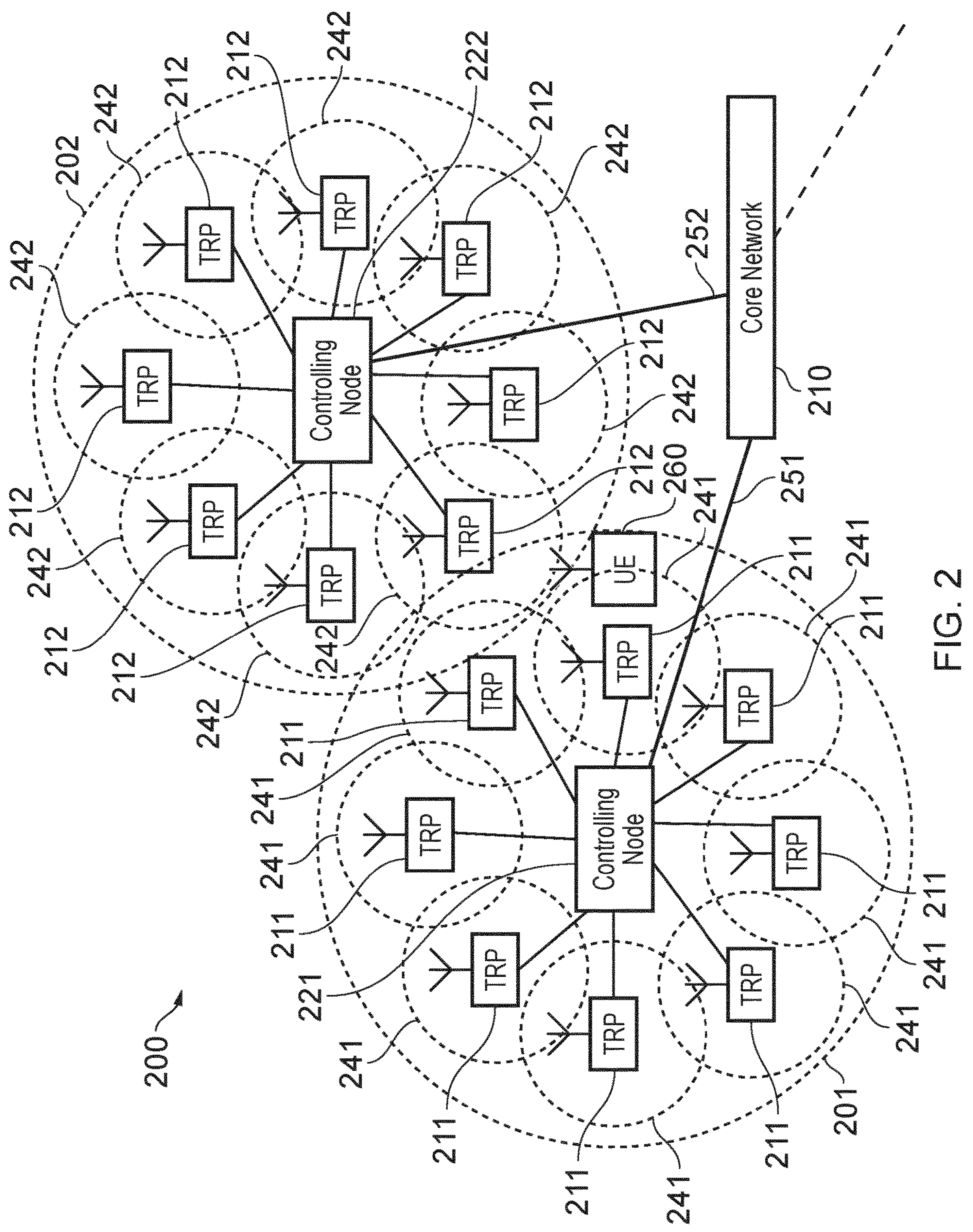
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Embodiments of the present technique can provide a method of operating by a communications device for transmitting or receiving via a wireless communications network. The method comprises receiving from an infrastructure equipment of a radio network part of the wireless communications mobility information indicating one or both of whether the infrastructure equipment is non-stationary and a location of the infrastructure equipment, and adapting an operation of the communications device in accordance with the mobility information. The adapted operation includes configuring the communications devices for transmitting signals to the infrastructure equipment or receiving signals from the infrastructure equipment according to the mobility information.

Example embodiments can utilise techniques for controlling a communication device's (UE's) access to a wireless communications network in which one or more of the infrastructure elements of a radio network part of the wireless communications network are non-stationary and mobile. Example embodiments can provide an indication to UEs of a base stations/gNB's position or that it is mobile. This is because:

1. More and more moving base stations e.g. HAPS, drone BS, which may be mounted on moving vehicles may be introduced. The speed of the vehicles may range from medium to high speed vehicles. A location of a base station will have impact on an uplink beam direction. It may be difficult for a UE to maintain beam correspondence if a relative speed between the base station and the UE is large and/or unknown.
2. For an IDLE mode UE's initial access, it would be better to avoid selecting a base station with high mobility in order to avoid frequent cell selection/reselection.
3. For CONNECTED mode UEs, if the gNB's (including neighbouring gNBs') location is available to the UE (together with RSRP measurement), the UE can decide the potential target base station and initiate HO itself. This can further reduce the measurement and reporting overhead that is often necessary in HO.

Figure 3:
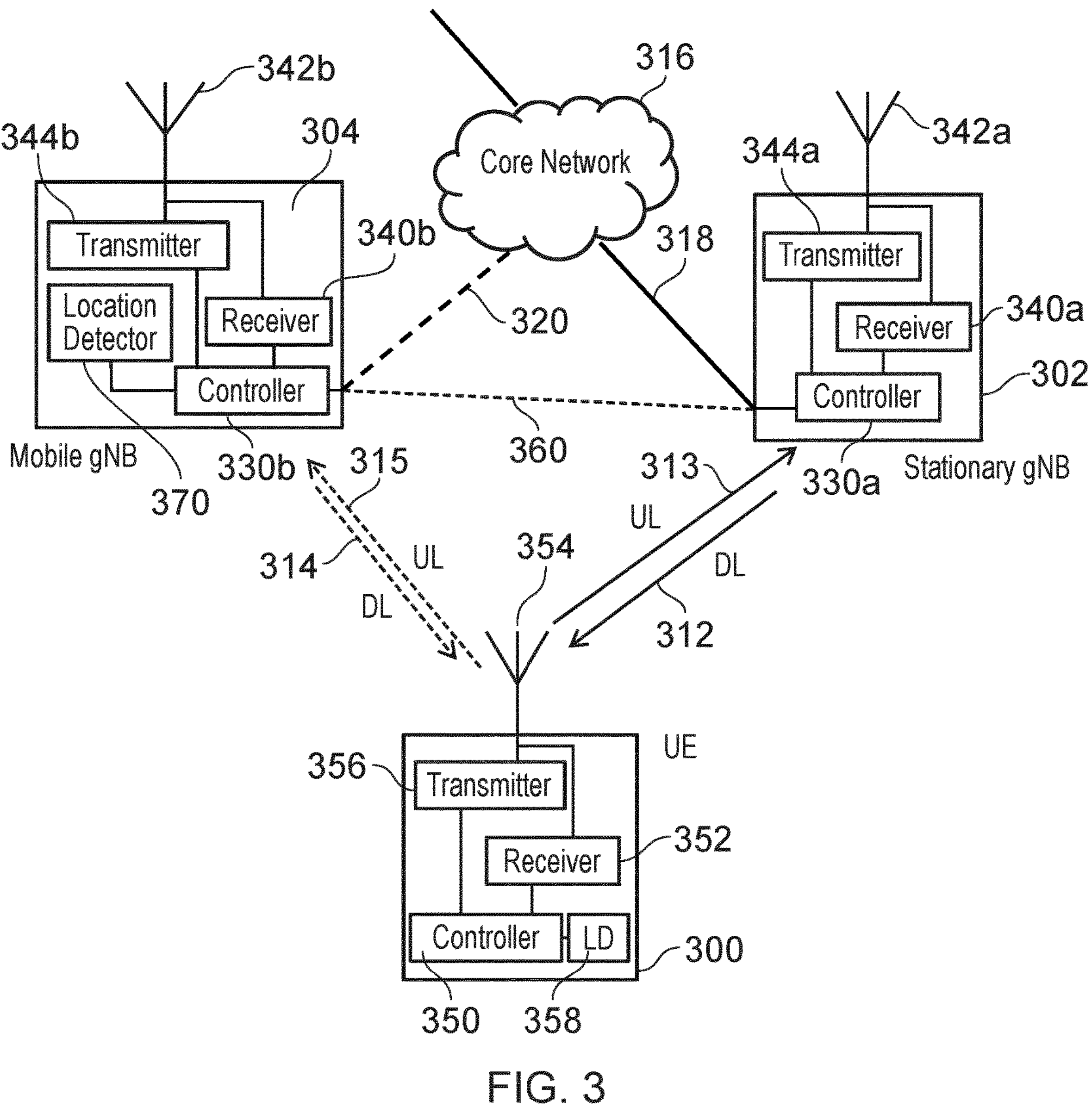
FIG. 3 shows a schematic representation of a wireless communications network having a radio network part including two infrastructure equipment one stationary and one mobile operating with a communications device in accordance with certain embodiments of the present disclosure.

A more detailed illustration of an example embodiment is provided in FIG. 3. In FIG. 3 a UE 300 and two example network infrastructure equipment 302, 304, which may be thought of as a gNB 101 or a combination of a controlling node 221 and TRP 211 are shown in detail where a first of the infrastructure equipment or gNB 302 is stationary, whereas a second of the infrastructure equipment or gNB 304 is mobile. The UE 300 is shown to receive downlink signals 312, 314 from one or both of the stationary infrastructure equipment 302 and the mobile infrastructure equipment 304 via resources of a wireless access interface (not shown) as illustrated generally by arrows 312, 314. Correspondingly, the UE 300 is configured to transmit uplink signals to one or both of the first and/or second infrastructure equipment 302, 304 via communications resources of the wireless access interface as represented by arrows 313, 315.

As illustrated for a 4G and 5G/NR examples in FIGS. 1 and 2, the first and second infrastructure equipment 302, 304 are connected to a core network 316 via interface (NG-C) 318, 320. Each of the interfaces 318, 320 connect to controllers 330*a*, 330*b* of the infrastructure equipment 302, 304, which form a protocol stack according to a conventional arrangement. The infrastructure equipment 302, 304 each include a receiver 340*a*, 340*b* connected to an antenna 342*a*, 342*b* and a transmitter 344*a*, 344*b* connected to the antenna 342*a*, 342*b* for receiving and transmitting signals forming the wireless access interface. Correspondingly, the UE 300 includes a controller 350 connected to a receiver 352 which receives signals from an antenna 354 and a transmitter 356 also connected to the antenna 354.

In contrast to the first infrastructure equipment, which is stationary and may include a wired or wireless connection to the core network 316, the second infrastructure equipment is mobile and so the transmitter 344*b* and the receiver 340*b* may form the NG-C interface 320 from a wireless connection to the core network 316. The infrastructure equipments may form part of an Integrated Access and Backhaul (IAB) network in which infrastructure equipment of a radio network part of a wireless communications network are interconnected by radio communications interfaces.

The first and second infrastructure equipment also include an interface 360 between each other for communicating control information between each other rather than via the core network in accordance with, for example, an Xn interface. For this example embodiment, the interface between the first and the second infrastructure equipment 360 may be formed by a wireless connection because the second infrastructure equipment is mobile. Hence a dotted line 360 connection is shown between the first and the second infrastructure equipment 302, 304. The interface 360 can be referred to as an Xn interface which communicates control signalling to facilitate handover of the UE 300 from the first to the second infrastructure equipment 302, 304.

The controller 330*a*, 330*b* of the respect stationary and mobile infrastructure equipment 302, 304 is configured to control the infrastructure equipment 302, 304 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 330*a*, 330*b* may comprise circuitry, which is suitably configured/programmed to provide the desired functionality using conventional programming/configuration techniques for equipment in wireless telecommunications systems. The transmitter 344*a*, 344*b* and the receiver 340*a*, 340*b* may comprise signal processing and radio frequency filters, amplifiers and circuitry in accordance with conventional arrangements. The transmitter 344*a*, 344*b*, the receiver 340*a*, 340*b* and the controller 330*a*, 330*b* are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 302, 304 will in general comprise various other elements associated with its operating functionality.

Correspondingly, the controller 350 of the UE 300 is configured to control the transmitter 356 and the receiver 352 and may comprise processor circuitry, which may in turn comprise various sub-units/sub-circuits for providing functionality as explained further herein. These sub-units may be implemented as discrete hardware elements or as appropriately configured functions of the processor circuitry. Thus the controller 350 may comprise circuitry, which is suitably configured/programmed to provide the desired functionality using conventional programming/configuration techniques for equipment in wireless telecommunications systems. Likewise, the transmitter 356 and the receiver 352 may comprise signal processing and radio frequency filters, amplifiers and circuitry in accordance with conventional arrangements. The transmitter 356, receiver 352 and controller 350 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 300 will in general comprise various other elements associated with its operating functionality, for example a power source, user interface, and so forth, but these are not shown in FIG. 3 in the interests of simplicity.

The controllers 330*a*, 330*b*, 350 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

According to example embodiments the second infrastructure equipment as a mobile gNB 304 includes a location detector device 370, which detects a location of the mobile gNB 304 using conventional techniques and feeds information indicating a location of the mobile gNB 304 to the controller circuitry 330*b*. Alternatively, a location of the mobile gNB 304 may be detected by the wireless communications network and communicated to the mobile gNB 304 and so in other embodiments the location detector 370 may not be present in the mobile gNB 304. As will be explained below, the UE 300 may also use a location detector 358 to identify the relative distance and angle of the mobile infrastructure equipment to improve radio communications.

As will be explained in the following paragraphs example embodiments can provide an arrangement in which a mobile infrastructure equipment communicates an indication of its location and/or an indication that it is non-stationary and therefore mobile. In response a communications device (UE) may be configured to adapt its behaviour to utilise the indication relating to the location and/or mobility of the mobile gNB to communicate via the wireless access interface more efficiently. In one example the UE operating in an idle mode may use the indication that a gNB is mobile not to select that gNB to attach to for receiving downlink messages from the wireless communications network or at least attach temporarily. In another example, the UE may use the indication that a gNB is mobile or an indication of its location so as to reject the mobile gNB as a target gNB for handover, or be informed by the network that the gNB cannot act as a target for handover. In another example, the UE may use a location of the gNB to steer transmit or receive antenna beams so as to communicate more effectively uplink or downlink data and control information.

A mobile gNB may be configured to transmit an indication of its location and/or that it is mobile in control information such as system information, typically broadcast by infrastructure equipment of radio access network in System Information Blocks (SIBs). A better understanding of embodiments which utilise a SIB to communicate an indication of a location and/or mobility of a gNB can be gained from an explanation in the following paragraphs of an operation of a UE when accessing a wireless communications network to form a connection.

gNB Signalling an Indication of Location or Mobility

For the example of 5G/NR communications, a UE operates in an initial access phase to establish a connection to the network. Once the initial access phase has been completed, the UE and network transition to operate in a connected phase, where a Radio Resource Control (RRC) connection exists between the UE and network. In the connected phase, the UE may communicate with the network via unicast signalling.

Figure 4:
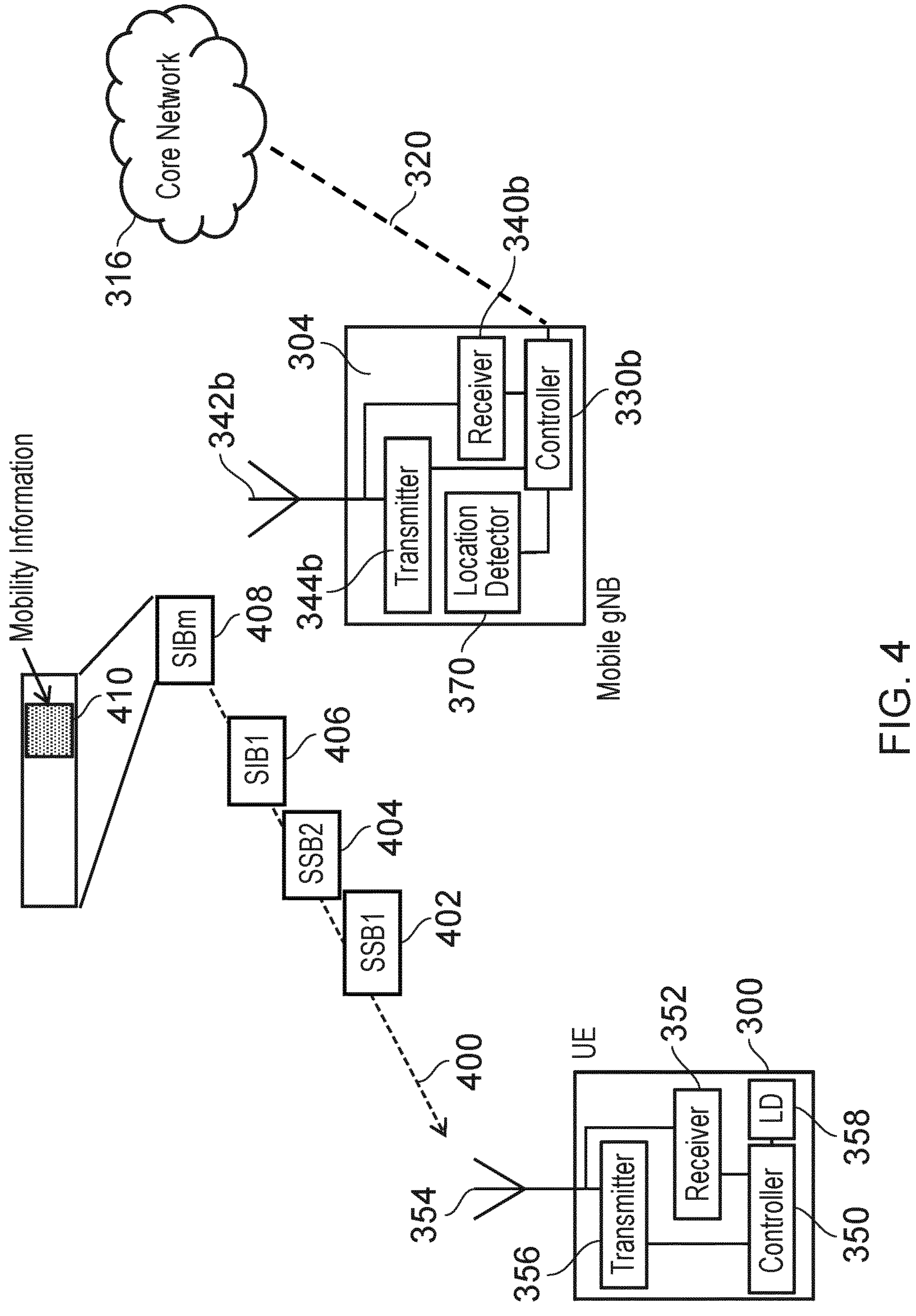
FIG. 4 shows a schematic representation of a wireless communications network of FIG. 4 illustrating an example embodiment in which mobility information is transmitted as part of a system information block.

FIG. 4 provides an example embodiment in which the UE receives mobility information transmitted in a System Information Block (SIB)-, which are broadcast by gNBs to UEs with a coverage area provided by a gNB forming a cell of the wireless access network. The broadcast of the SIBs is represented by an arrow 400. The parts which appear in FIG. 4 which are also shown in FIG. 3 have the same reference numerals. The mobility information may be for example a field indicating that the gNB is mobile, or indicating a current speed of the gNB or an indication of a current location of gNB.

As part of the initial access phase, the UE may receive one or more SSBs 402, 404 from the mobile gNB 304. Each SSB 420, 404 contains a synchronisation signal (SB) and a Physical Broadcast Channel (PBCH). After receiving the one or more SSBs 402, 404, the UE decodes the SSBs 402, 404. Decoding the SSBs 402, 404 allows the UE to achieve time and frequency synchronisation with the network by using the synchronisation signals within the SSBs 402, 404. Decoding the SSBs 402, 404 also allows the UE to receive a master information block (MIB) in each of the PBCHs to receive control resources required for decoding System Information Block 1 (SIB1) 406. For example, the MIB may provide information on control resource set (CORESET) #0 information elements number 0. It will be appreciated by one skilled in the art that CORESET #0 is a set of physical resources in 5G/NR which is used to carry a Physical Downlink Control Channel (PDCCH) for SIB1 scheduling.

As part of the initial access phase, the UE may search for and decode the PDCCH within CORESET #0 to determine a location of Physical Downlink Shared Channel (PDSCH) resources for SIB1. SIB1 contains radio resource configuration information that is common for all UEs that are served by the gNB, except information applicable to unified access control as will be appreciated by one skilled in the art. SIB1 also defines a scheduling of other system information, such as system information contained in SIB block 406, for the UE.

As part of the initial access phase, the UE may read the other system information in SIB blocks 406 based on the information obtained from SIB1. Using the system information, the UE may determine whether a cell of the gNB is a suitable cell for the UE to connect to the network. In addition, the UE may obtain parameters for a RACH procedure from the system information. For example, the system information may include one or more of: Physical Random Access Channel (PRACH) preambles which should be used in the RACH procedure, PRACH formats which should be used in the RACH procedure, locations of PRACH in time and frequency or the like as will be appreciated by one skilled in the art.

According to an example embodiment shown in FIG. 4, the mobile gNB is configured to transit a SIBm 408, which includes a field 410 providing mobility information to UEs, which are within a coverage area of a cell formed by the mobile gNB 304. As indicated, the mobility information may include one or more of a current location of the gNB 304 as determined by the location detector 370, a field indicating that the mobile gNB is mobile, and a current speed of the mobile gNB 304. As will be appreciated, if the mobility information provides an indication of a current location of the mobile gNB 304 and the SIBm is transmitted repeatedly at know intervals or can be requested on demand by the UE, each providing an update of the location of the mobile gNB 304, then a UE can infer that the mobile gNB is mobile, determine a current speed of the mobile gNB 304 and determine, from a most recent received mobility information, a location of the mobile gNB 304.

As explained above, once the initial access phase has been completed, the UE and network transition to operating in a connected phase, where an RRC connection exists between the UE and network. During the connected phase, the UE enters a connected mode 410 and may communicate with the network via unicast signalling. Since the gNB knows the bandwidth capability of the UE, the gNB may ensure transmissions to the UE are within the bandwidth capability of the UE.

As part of the connected phase, the UE may need to receive one or more broadcast or multicast messages. For example, in a case in which the system information changes, the UE may receive one or more MIB or SIB messages from the gNB to update the UE on the changed system information. These messages may include mobility information such as a location of the mobile gNB 304 and whether the UE can handover to the mobile gNB 304 or should handover to another gNB.

As indicated above, according to example embodiments a mobile gNB transmits an indication that it is mobile or an indication of its location using system information such as an SIB. The indication included in the system information can indicate whether a cell served by a gNB is a static/low speed/medium speed/high speed moving cell.

As another embodiment, this indication will be included in handover command. Alternatively, if such a cell does not broadcast SIB1 (like EN-DC SN), then the UE will adapt its behaviour not to camp due to missing system information but UEs in RRC_Connected are able to connect this high speed gNB. This is due to the fact that network controls the handover.

Figure 5:
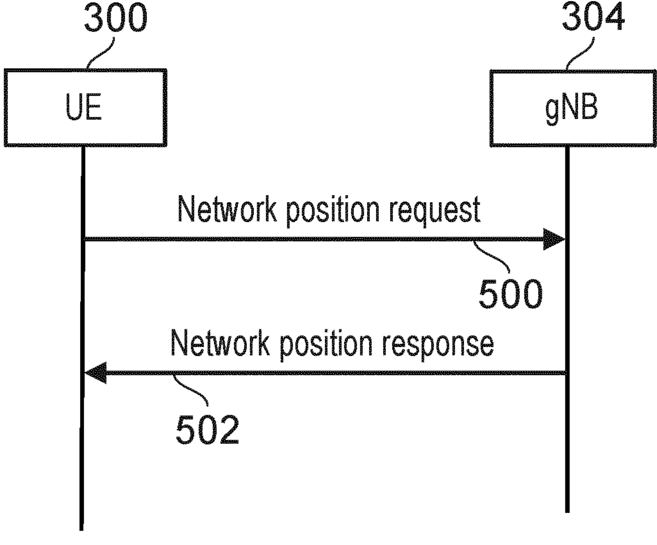
FIG. 5 is a message exchange diagram according to an example embodiment in which the mobility information is transmitted to the communications device in response to a request from a communications device.

According to another example embodiment as shown in FIG. 5, the UE may transmit a request 500 to a gNB or to a wireless communications network for a location of the mobile gNB 304 or the location of a particular gNB. The request 500 from the UE 300 may be received by the gNB 304 and a response generated by the gNB 304 or the request may be transmitted to the core network 316. The UE 300 may receive a response 502 from the mobile gNB 304 or from the wireless communications network the location of that mobile gNB 304. According to one example embodiment the request 500 for an indication of a location and/or mobility of a gNB and the response 502 may be via RRC signalling. According to this example embodiment, the UE 300 sends a network position request 500 to the network and the network responds by providing mobility information, which may include:

1) gNB's mobility status
2) gNB's GNSS location, e.g. coordinates
3) gNB's velocity
4) gNB's moving direction
5) Relative distance with UE, based on the network being informed of the UEs location or detecting the UE's location or the UE using an onboard GNSS to detect its own position
6) Neighbour gNB's location information, or
7) A Transmission Configuration Indicator, TCI, index for use by UEs when transmitting to the gNB.

In order to avoid unnecessary/frequent requests from UE, the network can set certain restrictions for the same UE to send the request. For example, a UE may be restricted for example to no more than x requests within y period. Such restrictions can be assigned based on a gNB's mobility status.

UE Operation to Trigger gNB Location Requests

According to some example embodiments the controller circuitry 350 on the UE 300 includes a clock which can be used by the UE to set a timer for requesting a location of the mobile gNB 304 periodically. According to this example therefore the UE 300 may be operating in connected mode and direct the request for the location of the mobile gNB 304 for example by RRC signalling. As such a periodic request can be triggered by a predefined timer. This timer can be signalled from network via a dedicated signalling or can be predefined according to the gNB's mobility status. For example if the mobile gNB 304 is has a relatively high mobility then the request for mobility information (location) can be generated more frequently.

As explained above the UE 300 may as include a location detector 358 which the UE can use to monitor its location and movement. Accordingly, the controller 350 can be configured to detect when the UE moves over a distance equal or exceeding a pre-configured threshold from a last time at which the UE sent a request 500 for the location of the mobile gNB 304. Furthermore, this distance threshold for triggering a request for the gNB's location can be scaled the controller 350 according to gNB's mobility status.

Adaptation of UE Based on Location of a gNB

As indicated above, in response to receiving mobility information relating to a mobile gNB, a UE may be configured to adapt its operation in order to improve its ability to transmit or to receive signals based on a received location of the mobile gNB. By providing a gNB's position information to a UE, the UE can optimise cell selection/reselection in an idle mode, beam management, and mobility enhancement. Examples are provided in the following paragraphs.

UE Transmit/Receive Beam Adaptation

As will be appreciated a UE and gNB may be configured with a plurality of antennas and to transmit signals as a focused beam or to receive signals from a gNB as a focused beam. Beam management procedures at the UE can be improved significantly if the UE knows both its position and the position of the mobile gNB. From these two positions, the UE can compute the bearing of the gNB from its location.

Figure 6:
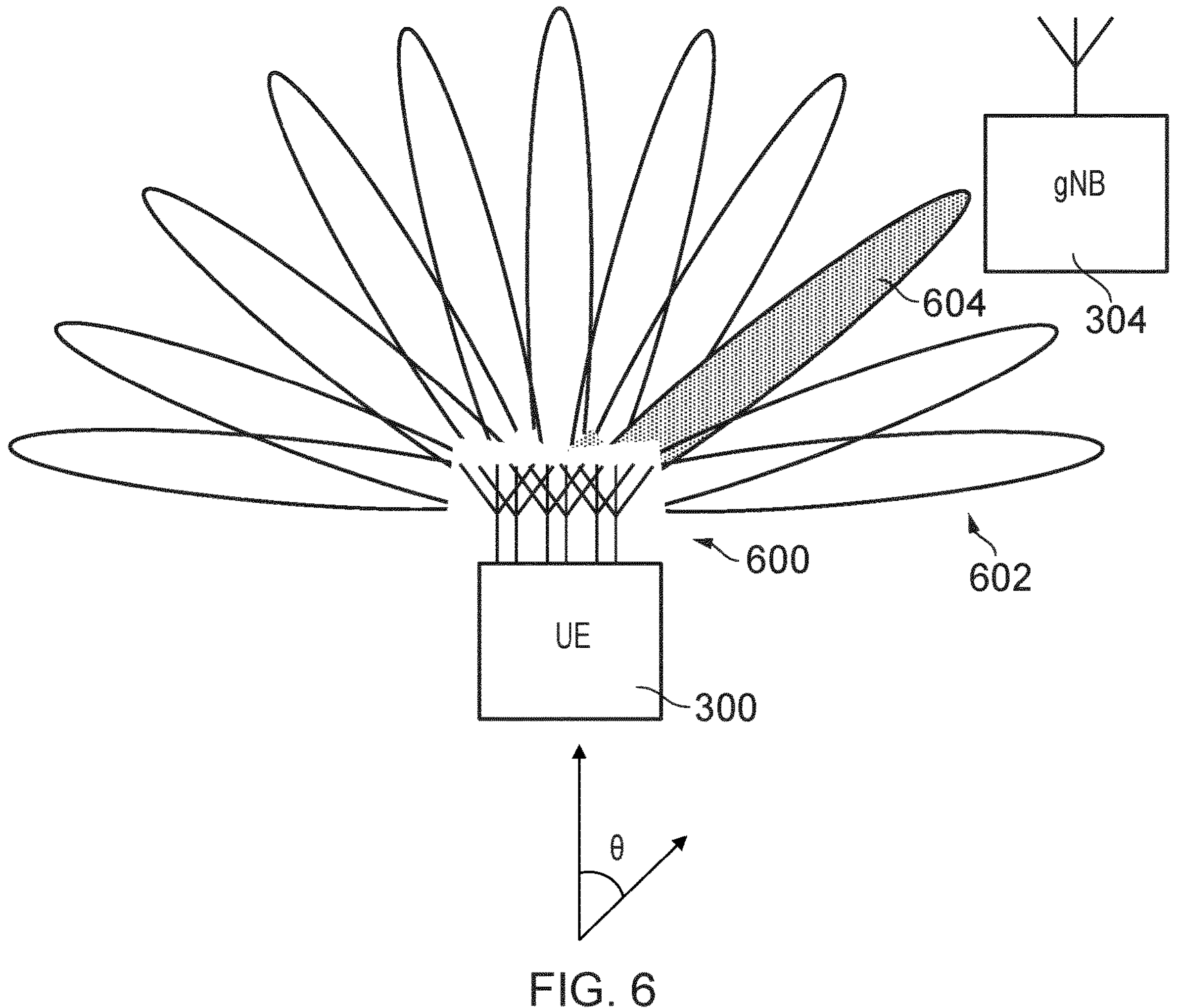
FIG. 6 is an illustrative representation of a communications device adapted to utilise beam forming and beaming selection in response to mobility information provided by an infrastructure equipment.

As illustrated in FIG. 6 if the UE is provided with antenna array 600 then the controller 350 may control the transmitter to select one of a plurality of 600 to direct the transmitted signals at the mobile gNB 304 based on a received indication of its location. A beam 604 may be selected by determining an angle θ of the mobile gNB 304 with respect to the UE 300. The angle θ may be determined by the controller 350 based on a relative location of the mobile gNB 304 with respect to the UE 300. The relative location of the mobile gNB 304 with respect to the UE 30 can be determined from a received indication of the location of the mobile gNB 304 and the location of the UE 300 calculated from its location detector 350. A corresponding control of the receiver to receive signals in a beam focus at the mobile gNB 304 can be performed to improve signal reception. The location of the mobile gNB 304 is therefore used to adapt a beam measurement and a beam management procedure as explained in the following paragraphs:

Beam measurements: The UE 300 can perform measurements for beam tracking for example in RRC connected mode. For beam measurement, the UE has the direction of the beam θ and the resources for its associated CSI-RS. When performing beam measurements, the UE can steer its receive antennas (forms a coherent reception beam) in a direction of the mobile gNB 304 and then measure channel state information reference symbols (CSI-RS). If the UE has the bearing θ of the gNB, the UE can limit its measurements only to beams coming from that bearing (plus, minus some delta angle) while setting the measurement metrics for the beams of other directions to zero. The advantage here is to save UE power by reducing the number of measurements it does only to those likely to be most fruitful.

Beam tracking: when beam tracking, the connected mode UE processes the CSI-RS of the beam from which signals are being received. Measurement information of signal strength of the CSI-RS from the received beam is sent as a CSI-type report to the gNB, which uses the measurement information to reduce errors in directing a transmitted beam at the UE 300. Similarly, the UE 300 can alter the uplink beam forming vectors to correct pointing errors of the uplink beam. If the UE has an accurate bearing θ of the gNB from which the downlink beam is received, any beam tracking errors can be reduced by ensuring that results of tracking tend towards this bearing θ. Furthermore, to minimize beam tracking errors, frequent aperiodic CSI-RS or high CSI-RS periodicity measurements are desirable as this ensures frequent reception of CSI-RS from gNB. As a result the measurements can be used to update beam tracking. If the mobile gNB bearing information is available to the UE, the UE can ensure that its receive and transmit beams match this bearing θ in the intervals between CSI-RS. This can provide an advantage by enabling an increase in beam tracking accuracy even for low periodicity of CSI-RS. A further technical advantage can be provided by an increase in network throughput by minimizing CSI-RS overhead.

According to another example embodiment, the network may signal to the UE a recommended uplink beam index based on a reported location of the UE and the gNB. According to this example therefore, the UE and the gNB will report the location of each to the network. The locations of the UE and the gNB are then used to selected the uplink beam, which may be signalled as an uplink beam index (TCI states) in for example DCI or MAC CE. This signalling can be triggered when the UE's location is known and the gNB is a high mobility base station or a relative speed between the UE and the gNB is high, where the beam correspondence will not remain for more than a predetermined time determined to ensure signalling overhead efficiency. According to this example, the UE will adopt the UL beam indicated by the network.

UE Initiated Handover

As mentioned above a UE may have a controller 350 which includes a location detector 358 which can be used by the controller 350 to determine the position of the UE. According to example embodiments the UE can also receive a location of the mobile gNB 304, which may be a serving gNB to the UE 300 or may be a neighbouring gNB. From a determined relative location of a gNB, a UE can predict when and which gNB is to be a target for handover. Such a location information directed handover decision could be combined with RSRP measurements, which are conventionally used exclusively to determine a target gNB for handover. After determining the target gNB for handover, the UE can be configured to send a handover request to the network indicating the preferred target gNB for the handover. With this solution, a signalling overhead required for measurement reporting and the overall handover can be greatly reduced compared with an example in which a gNB is static.

Location Based Handover

As a further enhancement to a network directed handover, a UE can calculate a distance between it and a gNB based on their respective locations. The distance between the UE and a gNB can be communicated to the network with the received signal strength measurements which can then be used by the network to determine whether UE should be directed to handover and which gNB is to form the target gNB for the handover. As such, a distance between the UE and a target gNB may be combined with the RSRP threshold and be used to perform a conditional handover as one criteria to trigger the handover. With the knowledge of gNB's location, together with UE's own location, the UE can trigger the handover by reporting the distance between the UE and the gNB.

Figure 7:
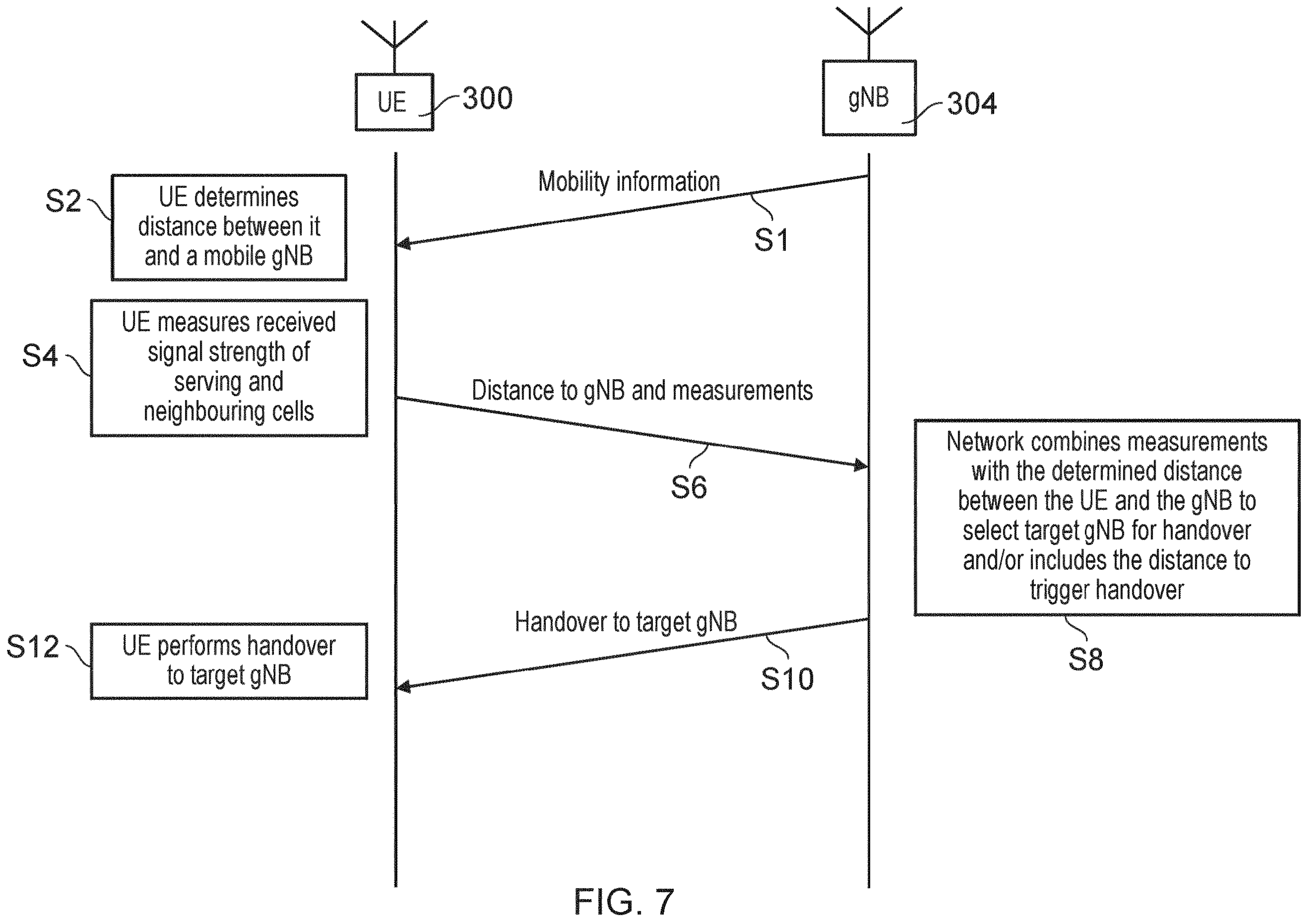
FIG. 7 is a part flow diagram, part message diagram of an adapted handover procedure according to an example embodiment.

FIG. 7 provides a schematic flow diagram illustrating an adaptation of a network directed handover according to an example embodiment. In a first step S1, for example as represented in FIG. 5, the mobile gNB 304 transmits mobility information to the UE 300, which provides an indication of a location of the mobile gNB 304. In step S2, the UE 300 determines its location and then determines a distance between the UE and the mobile gNB based on the location of the mobile gNB provided by the mobility information and the determined location of the UE. In step S4, the UE then performs measurements of received signal strength from a serving gNB and one or more neighbouring gNB as part of a handover procedure, the mobile gNB being one of the serving gNB or one of the one or more neighbouring mobile gNB. In step S6 the UE then adapts the handover procedure by transmitting the distance between UE and the mobile gNB with the measurements of the received signals strength. In step S8, the network selects one of the one or more neighbouring gNB as a target for handover or to remain on its currently serving gNB (no handover). In accordance with this example embodiment, the network may combine the received signal strength measurements with the distance between the UE and the mobile gNB, by, for example, excluding the received signal strength measurements from the mobile gNB, when selecting the target gNB, if the distance between the UE and the mobile gNB is greater than a predetermined distance. Alternatively, the network can make a conditional handover decision based on the distance between the UE and the mobile gNB being less than a predetermined distance, by always selecting the mobile gNB if the distance is less than the predetermined distance. If the UE is to handover to a target gNB then in step S10 the network transmits a handover command with the indication of the target gNB. In step S12, the UE performs the handover procedure to the target gNB.

In another example embodiment, a handover procedure may be adapted to trigger a process for performing measurements based on a distance between the UE and mobile gNB. The distance between the UE and the mobile gNB can be included as one of the criteria to trigger the UE performing measurements of received signal strength from neighbouring gNB and the serving gNB as part of the handover procedure. This may be combined with a received signal strength from the mobile gNB as the serving gNB falling below a predetermined threshold or a received signal strength from the neighbouring gNB being above a predetermined threshold according to a convention handover procedure. For example, with knowledge of gNB's location, together with UE's own location, the UE can decide when to start performing measurements. For example, by determining a distance between the UE and the mobile gNB, based on their determined locations, the UE can decide whether or not to begin performing measurements of received signal strength of one or more neighbouring gNBs. For example, if the mobile gNB is currently the serving gNB, then if the distance between the UE and the mobile gNB is below a predetermined distance, the UE does not perform measurements of received signal strength from neighbouring gNBs. In another example, if the mobile gNB is the serving gNB, the UE does not perform or report measurements of the one or more neighbouring gNBs until a distance between the UE and the mobile gNB exceeds a predetermined distance. According to this example embodiment a flow diagram is provided in FIG. 8 as an example illustration.

Figure 8:
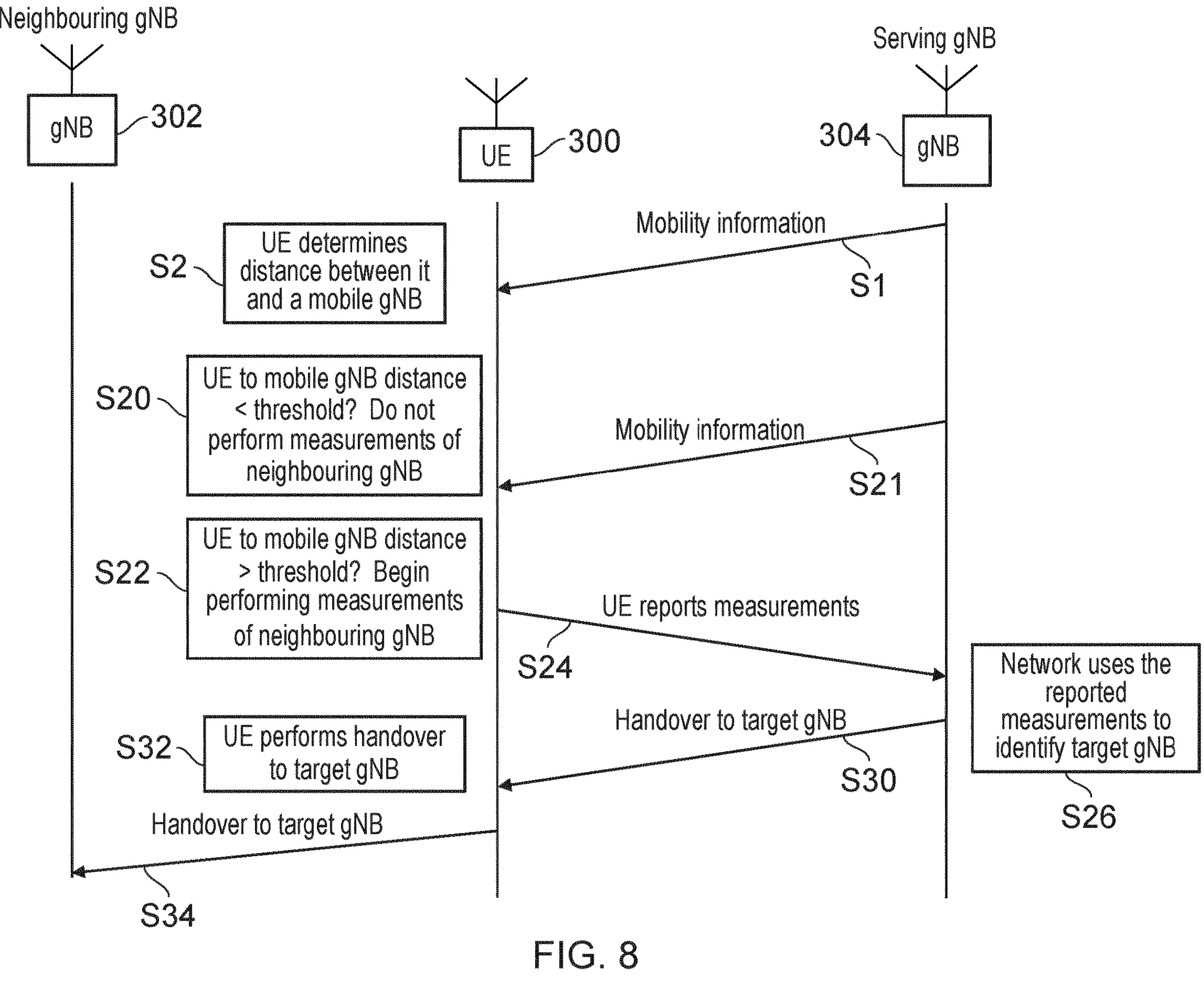
FIG. 8 is a part flow diagram, part message diagram of an adapted handover procedure according to another example embodiment.

FIG. 8 is summarised as follows, with only the differences with reference to FIG. 7 described. The first and second steps, S1, S2 correspond to that of FIG. 7 and from these steps the UE is able to calculate the distance between it and the mobile gNB 304. For the example of FIG. 8, the mobile gNB 304 is the serving gNB for the UE. The UE then at step S20 compares the distance between it and the mobile gNB 304 with a (closeness) threshold distance and if below this threshold distance indicating that the UE is close to the mobile gNB 304, the UE does not perform measurements of received signal strength of neighbouring gNBs 302 because, for example, it is so close to its serving gNB that it is unlikely that any neighbouring gNB can provided a better radio link. After a further time, which may be a periodic update, the mobile gNB 304 then send updated mobility information at step S21. The UE 300 then determines a distance between itself and the mobile gNB 304 as it performed in steps S1 and S2. On this occasion, the distance may exceed the closeness threshold. As such as a further step the UE compares the distance between it and the mobile gNB 304 with a second threshold distance and if greater than this second threshold distance indicating that the mobile gNB 304 may be further away from the UE than a neighbouring gNB, then the UE performs measurements of received signal strength of neighbouring gNBs 302. The UE then reports these measurements at step S24 and then the network determines at step S26 whether a handover should be performed to a target gNB. The UE then receives a handover command (step S30) and performs a handover to the target gNB in steps S32 and S34.

UE Adapted Cell Reselection

Cell reselection generally refers to a process whereby the communications device changes its serving cell to a new cell, the new cell having been selected by the communications device typically when in idle mode. Unlike a handover procedure, which is typically directed by a wireless communications network, cell reselection can occur while the communications device is in an idle or an INACTIVE mode, not having an active RRC connection in the serving cell. When in IDLE mode a UE 300 can perform cell selection/re-selection, based on the received signal strength (RSRP) measurements it receives from gNBs forming a radio network. However if a gNB transmits mobility information then, depending on the mobility information, the UE may determine not to select that gNB. For example, if the mobility information indicates that the gNB is mobile, then the controller 350 in the UE 300 may determine not to select the gNB. In another example if the location information received periodically as part of the mobility information indicates that the speed of the mobile gNB 304 exceeds a predetermined threshold then the controller 350 will determined that it should not select that gNB. This is because if the gNB has medium/high speed then the UE will need to re-select a different cell in a relatively short time making the selection of that mobile gNB inefficient.

Figure 9:
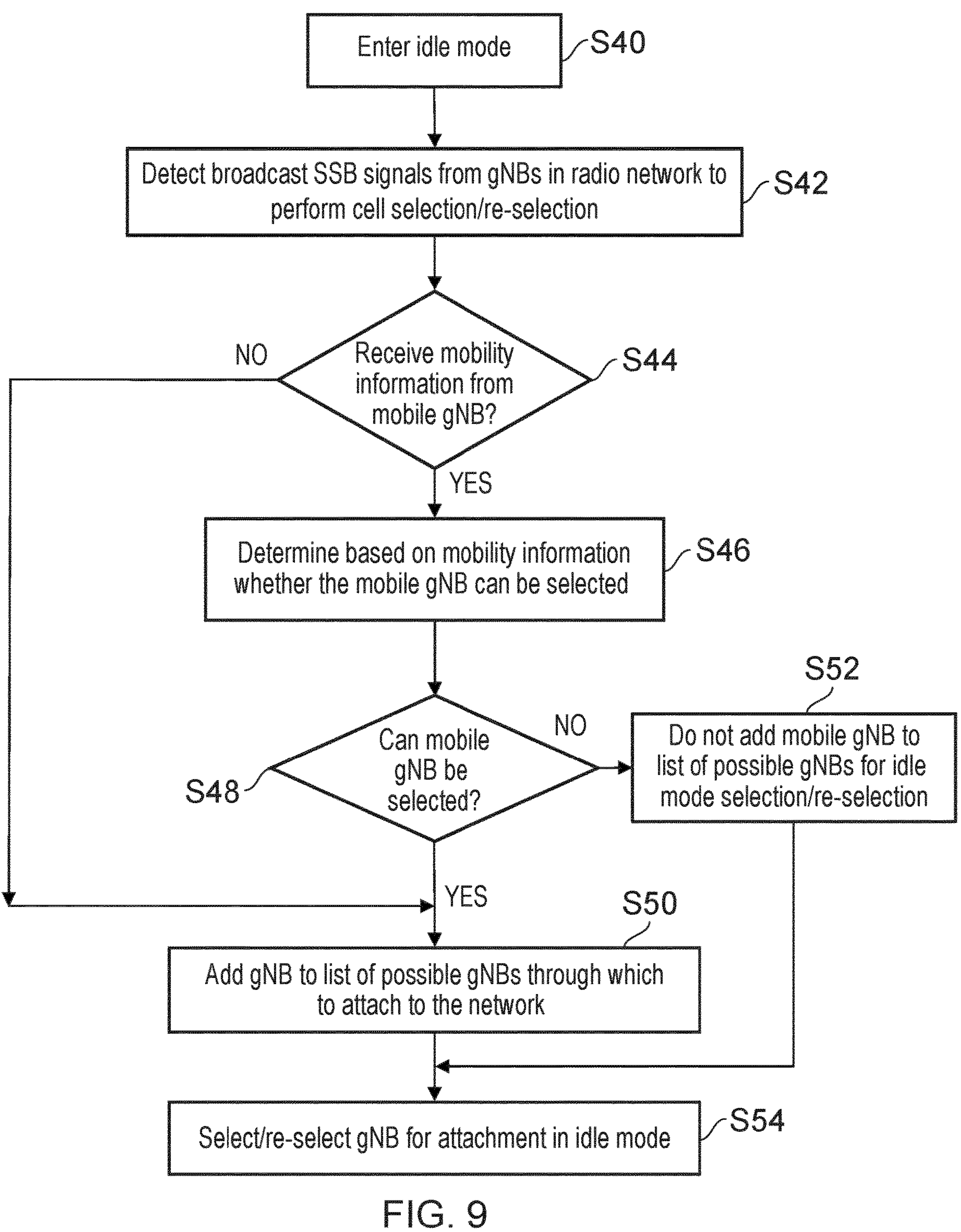
FIG. 9 is a flow diagram representing an example operation of a communications device performing a cell selection/re-selection procedure according to an example embodiment.

A flow diagram illustrating an example operation of the UE 300 of FIG. 4 according to an example embodiment is illustrated by the flow diagram of FIG. 9. As a first step, S40, the UE 300 enters or starts an idle state in the sense, for example, that it does not have an RRC connection to the mobile communications network for transmitting and receiving AS data. As such, the UE needs to camp onto/attach to a cell of the radio network by identifying a cell and an associated gNB, which forms the cell, in order to receiving paging message and system information for moving into a connected state when the UE is to transmit or receive data. As part of this procedure, the UE detects SSB signals transmitted by the gNBs in the network and usually based in the signal strength received selects or re-selects a cell, which it registers with the network. Accordingly, the UE detects the broadcast SSBs from the gNBs of the radio network as step S42. Of course as explained above, if the gNB does not transmit an SIB1, perhaps because it is non-stationary then the UE will not select this cell.

At step S44, the UE detects whether or not it has received mobility information from a gNB. If it has not received mobility information, it assumes that it is a stationary gNB and processing moves to step S50 in which the gNB is added to a list of candidate gNBs for selection.

If at step S44 the UE detects mobility information then that gNB is mobile and so the UE receives the mobility information from the mobile gNB according to this example embodiment. The UE uses the mobility information, in step S46, to determine according to certain criteria, as explained above, whether the mobile gNB can be selected by the UE. For example, the mobile gNB may be moving too quickly or be too far away. According to these criteria, the UE determines, at decision point S48, whether the mobile gNB can be selected or not. If the mobile gNB can be selected then the operation moves to step S50 and the mobile gNB is added as a candidate for selection by the UE for example based on received signal strength of the SSB at step S54. If at decision point S48 it is determined that the UE cannot be selected then processing moves to step S52 and the mobile gNB is not added as a candidate for selection and processing moves to the final step S54 of selecting or re-selection a gNB from a list of detected available candidates.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not of primary significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Respective features of the present disclosure are defined by the following numbered paragraphs:

Paragraph 1. A method of operating by a communications device for transmitting or receiving via a wireless communications network, the method comprising
receiving, from an infrastructure equipment of a radio network part of the wireless communications network, mobility information indicating one or both of whether the infrastructure equipment is non-stationary and a location of the infrastructure equipment, and
adapting an operation of the communications device in accordance with the mobility information, the adapted operation configuring the communications devices for transmitting signals to the infrastructure equipment or receiving signals from the infrastructure equipment according to the mobility information.

Paragraph 2. A method of paragraph 1, wherein the receiving the mobility information comprises transmitting, by the communications device in a connected mode, a request for the mobility information, to the infrastructure equipment, and in response, receiving the mobility information.

Paragraph 3. A method of paragraph 2, wherein the transmitting the request comprises transmitting the request for the mobility information periodically, and the receiving the mobility information comprise receiving the mobility information periodically, the mobility information being updated in accordance with a time that the infrastructure equipment periodically transmits the mobility information.

Paragraph 4. A method of paragraph 1, wherein the receiving the mobility information comprises receiving the mobility information broadcast by the infrastructure equipment.

Paragraph 5. A method of paragraph 4, wherein the mobility information is broadcast in a system information block.

Paragraph 6. A method of any of paragraphs 1 to 5, wherein the adapting the operation of the communications device in accordance with the mobility information comprises
performing an idle mode selection/re-selection of one of a plurality of infrastructure equipment forming a radio network part of the wireless communications network for receiving information from the wireless communications network,
determining from the mobility information whether the communications device can select or re-select the infrastructure equipment according to predetermined criteria, and
adapting the idle mode selection/re-selection depending on whether the predetermined criteria determined that the infrastructure equipment should not be selected or re-selected.

Paragraph 7. A method of paragraph 6, wherein the mobility information provides an indication of whether the infrastructure equipment is non-stationary, and the predetermined criteria include not selecting or re-selecting the infrastructure equipment which is non-stationary.

Paragraph 8. A method of paragraph 6, wherein the mobility information indicates that the infrastructure equipment is non-stationary and provides information from which a speed of the non-stationary infrastructure equipment can be determined and the predetermined criteria include not selecting or re-selecting the infrastructure equipment, which is moving at a speed which exceeds a predetermined threshold.

Paragraph 9. A method of paragraph 6, wherein the determining from the mobility information whether the communications device can select or re-select the infrastructure equipment according to predetermined criteria comprises
determining that the infrastructure equipment is not transmitting a System Information Block 1, SIB1, which includes radio resource configuration information or a schedule of other SIBs which would have been broadcast by the infrastructure equipment.

Paragraph 10. A method of paragraphs 1 to 5, wherein the mobility information provides an indication of a location of the infrastructure equipment, and the communications device is configured to transmit signals using a focused beam of coherently combined signals in a selected direction and to receive signals as a focused beam of coherently combined signals from a selected direction, and the method comprises determining, by the communications device, a location of the communications device, determining a relative bearing of the infrastructure equipment with respect to the communications device from the location of the infrastructure equipment determined from the received mobility information and the determined location of the communications device, and the adapting the operation of the communications device in accordance with the mobility information comprises one or both of adapting a transmit beam selection by adapting a direction of transmitting a beam of the signals according to the determined relative bearing, or adapting a receive beam selection by adapting a direction of receiving signals as a beam according to the determined relative bearing.

Paragraph 11. A method of paragraph 10, wherein the adapting the operation of the communications device in accordance with the mobility information comprises adapting a beam management procedure to measure received reference symbols from one or more received beam selected with a direction corresponding to the determined relative bearing.

Paragraph 12. A method of paragraph 11, wherein the adapting the beam management procedure comprises measuring channel state information reference symbols, CSI-RS, for one or more beams received in a direction determined from the relative bearing of the infrastructure equipment with respect to the communications device, setting measurements associated with one or more beams received in direction other than that determined from the relative bearing of the infrastructure equipment, and selecting, based on the measured CSI-RS, one of the beams.

Paragraph 13. A method of paragraph 11, comprising transmitting measurement information associated with the measured CSI-RS for the one or more beams in the direction determined from the relative bearing to the infrastructure equipment, the measurement information being used by the infrastructure equipment to direct a beam of transmitted signals towards the communications device.

Paragraph 14. A method of paragraph 10, wherein the adapting the transmit beam selection by adapting a direction of transmitting the beam of the signals according to the determined relative bearing comprises adapting a beam tracking procedure to measure received channel state information reference symbols, CSI-RS, from one or more received beam selected with a direction corresponding to the determined relative bearing of the infrastructure equipment, and selecting a direction of transmission of the uplink beam based on the measured CSI-RS of the one or more received beams.

Paragraph 15. A method of paragraphs 1 to 5, wherein the mobility information provides an indication of a location of the infrastructure equipment, and the method comprises determining, by the communications device, a location of the communications device, determining a distance between the communications device and the infrastructure equipment based on the location of the infrastructure equipment provided by the mobility information and the determined location of the communications device and the adapting the operation of the communications device in accordance with the mobility information comprises performing measurements of received signal strength from a serving infrastructure equipment and one or more neighbouring infrastructure equipment as part of a handover procedure, the infrastructure equipment being one of the serving infrastructure equipment or one of the one or more neighbouring infrastructure equipment, and adapting the handover procedure based on the distance between the communications device and the infrastructure equipment and the measurements of the received signals strength for the communications device to handover to one of the one or more neighbouring infrastructure equipment as a target for handover or to remain on the serving infrastructure equipment.

Paragraph 16. A method of paragraph 15, wherein the handover procedure is a network directed handover procedure, the adapting the handover procedure comprising transmitting the determined distance between the communications device and the infrastructure equipment with the measurement of the received signal strength from a serving infrastructure equipment and one or neighbouring infrastructure equipment as part of the handover procedure, and receiving a handover instruction to handover to the target infrastructure equipment determined by the network from the received measurements combined with the distance.

Paragraph 17. A method of paragraph 15 or 16, wherein the performing measurements of received signal strength from the serving infrastructure equipment and one or more neighbouring infrastructure equipment as part of the handover procedure comprises comparing the distance between the communications device and the infrastructure equipment with a first closeness threshold and if the distance is less than the closeness threshold not performing or reporting the measurements of received signal strength from the serving infrastructure equipment and the one or more neighbouring infrastructure equipment, and comparing the distance between the communications device and the infrastructure equipment with a second threshold and if the distance is greater than the second threshold performing or reporting the measurements of received signal strength from the serving infrastructure equipment and the one or more neighbouring infrastructure equipment.

Paragraph 18. A method of any of paragraphs 15, 16 or 17, wherein the handover procedure is initiated by the communications device, the adapting the handover procedure comprising determining the target infrastructure equipment or to remain on the serving infrastructure equipment based on the determined distance between the communications device and the infrastructure equipment combined with the measurement of the received signal strength from the serving infrastructure equipment and the one or neighbouring infrastructure equipment.

Paragraph 19. A method of any of paragraphs 1 to 18, wherein the mobility information includes one or more of a mobility status of the infrastructure equipment, a location of the infrastructure equipment, a velocity of the infrastructure equipment, a moving direction of the infrastructure equipment, a recommended uplink beam index, a recommended transmission configuration indicator, TCI, state and a location of neighbouring infrastructure equipment.

Paragraph 20. A method of operating an infrastructure equipment forming part of a wireless communications network, the comprising transmitting by the infrastructure equipment mobility information indicating one or both of whether the infrastructure is non-stationary and a location of the infrastructure equipment for use by one or more communications devices to adapt an operation of the one or more communications devices in accordance with the mobility information for transmitting signals to the infrastructure equipment or receiving signals from the infrastructure equipment according to the mobility information.

Paragraph 21. A method of paragraph 20, wherein the wherein the mobility information includes one or more of a mobility status of the infrastructure equipment, a location of the infrastructure equipment, a velocity of the infrastructure equipment, a moving direction of the infrastructure equipment, a recommended uplink beam index, a recommended transmission configuration indicator, TCI, state and a location of neighbouring infrastructure equipment.

Paragraph 22. A method of paragraph 20 or 21, comprising receiving as part of an adapted handover procedure from a communications device an estimated distance between the communications device and the infrastructure equipment, or a location of the communications device, and measurements of a received signal strength from a serving infrastructure equipment and one or neighbouring infrastructure equipment as part of the handover procedure for the communications device, determining a target infrastructure equipment for the communications device based on the received signal strength measurements and a distance between the communications device and the infrastructure equipment determined from the location of the communications device or the estimated distance received from the communications device, and transmitting a handover instruction to handover to the target infrastructure equipment determined by the network from the received measurements combined with the distance.

Paragraph 23. A method of paragraph 20 or 21, wherein the mobility information provides an indication of a location of the infrastructure equipment, and the method comprises transmitting signals as one or more of a plurality of beams of signals to a communications device, receiving measurement information associated with measurements for one or more of the beams of signals received by the communications device in a direction determined from the relative bearing of the infrastructure equipment, the relative bearing being determined by the communications device, and adapting the transmission of the signals by selecting one or more of the plurality of beams in accordance with the received measurement information.

Paragraph 24. A communications device comprising transmitter circuitry configured to transmit signals via a wireless access interface of a wireless communications network, receiver circuitry configured to receive signals transmitted via the wireless communications network, and controller circuitry configured to control the transmitter circuitry and the receiver circuitry, the controller circuitry being configured with the receiver circuitry to receive, from an infrastructure equipment of a radio network part of the wireless communications network, mobility information indicating one or both of whether the infrastructure equipment is non-stationary and a location of the infrastructure equipment, and the controller circuitry is configured to adapt the control of one or both of the transmitter circuitry and the receiver circuitry according to the mobility information received from the infrastructure equipment.

Paragraph 25. A communications device of paragraph 24, wherein the controller circuitry is configured to adapt the control of the receiver circuitry according to the mobility information by performing an idle mode selection/re-selection of one of a plurality of infrastructure equipment forming a radio network part of the wireless communications network for receiving information from the wireless communications network, determining from the mobility information whether the communications device can select or re-select the infrastructure equipment according to predetermined criteria, and adapting the idle mode selection/re-selection depending on whether the predetermined criteria determined that the infrastructure equipment should not be selected or re-selected.

Paragraph 26. A communications device of paragraph 24, wherein the mobility information provides an indication of a location of the infrastructure equipment, and the transceiver circuitry is configured to transmit signals using a focused beam of coherently combined signals in a selected direction and the receiver circuitry is configured to receive signals as a focused beam of coherently combined signals from a selected direction, and the controller circuitry is configured to determine a location of the communications device, to determine a relative bearing of the infrastructure equipment with respect to the communications device from the location of the infrastructure equipment determined from the received mobility information and the determined location of the communications device, and to adapt the control of one or both of the transmitter circuitry according to the mobility information by adapting a transmit beam selection to be in a direction of transmitting a transmit beam of the signals according to the determined relative bearing, or the receiver circuitry according to the mobility information by adapting a receive beam selection to be in a direction of receiving signals as a receive beam according to the determined relative bearing.

Paragraph 27. A communications device of paragraph 24, wherein the mobility information provides an indication of a location of the infrastructure equipment, and the controller circuitry is configured to determine a location of the communications device, to determine a distance between the communications device and the infrastructure equipment based on the location of the infrastructure equipment provided by the mobility information and the determined location of the communications device, and to adapt the control of the receiver circuitry according to the mobility information by performing measurements of received signal strength from a serving infrastructure equipment and one or more neighbouring infrastructure equipment as part of a handover procedure, the infrastructure equipment being one of the serving infrastructure equipment or one of the one or more neighbouring infrastructure equipment, and adapting the handover procedure based on the distance between the communications device and the infrastructure equipment and the measurements of the received signals strength for the communications device to handover to one of the one or more neighbouring infrastructure equipment as a target for handover or to remain on the serving infrastructure equipment.

Paragraph 28. An infrastructure equipment of a wireless communications network for communicating with one or more communications devices, the infrastructure equipment comprising transmitter circuitry configured to transmit signals via a wireless access interface provided by the infrastructure equipment to the one or more communications devices, receiver circuitry configured to receive signals transmitted via the wireless access interface, and controller circuitry configured to control the transmitter circuitry and the receiver circuitry, the controller circuitry being configured with the transmitter circuitry to transmit mobility information indicating one or both of whether the infrastructure equipment is non-stationary and a location of the infrastructure equipment for use by one or more communications devices to adapt an operation of the one or more communications devices in accordance with the mobility information for transmitting signals to the infrastructure equipment or receiving signals from the infrastructure equipment according to the mobility information.

Paragraph 29. An infrastructure equipment of paragraph 28, wherein the mobility information includes one or more of a mobility status of the infrastructure equipment, a location of the infrastructure equipment, a velocity of the infrastructure equipment, a moving direction of the infrastructure equipment, a recommended uplink beam index, a recommended transmission configuration indicator, TCI, state and a location of neighbouring infrastructure equipment.

Paragraph 30. An infrastructure equipment of paragraph 28 or 29, wherein the controller circuitry is configured with the receiver circuitry to receive as part of an adapted handover procedure from a communications device an estimated distance between the communications device and the infrastructure equipment, or a location of the communications device, and measurements of a received signal strength from a serving infrastructure equipment and one or neighbouring infrastructure equipment as part of the handover procedure for the communications device, to determining a target infrastructure equipment for the communications device based on the received signal strength measurements and a distance between the communications device and the infrastructure equipment determined from the location of the communications device or the estimated distance received from the communications device, and to control the transmitter circuitry to transmit a handover instruction to handover to the target infrastructure equipment determined by the network from the received measurements combined with the distance.

Paragraph 31. An infrastructure equipment of paragraph 28 or 29, wherein the mobility information provides an indication of a location of the infrastructure equipment, and the controller circuitry is configured to control the transmitter circuitry to transmit signals as one or more of a plurality of beams of signals to a communications device, to control the receiver circuitry to receive measurement information associated with measurements for one or more of the beams of signals received by the communications device in a direction determined from the relative bearing of the infrastructure equipment, the relative bearing being determined by the communications device, and to adapt a transmission of the signals by the transmitter circuitry to select one or more of the plurality of beams in accordance with the received measurement information.

Paragraph 32. Circuitry of a user equipment comprising transmitter circuitry configured to transmit signals via a wireless access interface of a wireless communications network, receiver circuitry configured to receive signals transmitted via the wireless communications network, and controller circuitry configured to control the transmitter circuitry and the receiver circuitry, the controller circuitry being configured with the receiver circuitry to receive, from an infrastructure equipment of a radio network part of the wireless communications network, mobility information indicating one or both of whether the infrastructure equipment is non-stationary and a location of the infrastructure equipment, and the controller circuitry is configured to adapt the control of one or both of the transmitter circuitry and the receiver circuitry according to the mobility information received from the infrastructure equipment.

Paragraph 33. Circuitry of an infrastructure equipment of a wireless communications network for communicating with one or more communications devices, the circuitry comprising transmitter circuitry configured to transmit signals via a wireless access interface provided by the infrastructure equipment to the one or more communications devices, receiver circuitry configured to receive signals transmitted via the wireless access interface, and controller circuitry configured to control the transmitter circuitry and the receiver circuitry, the controller circuitry being configured with the transmitter circuitry to transmit mobility information indicating one or both of whether the infrastructure equipment is non-stationary and a location of the infrastructure equipment for use by one or more communications devices to adapt an operation of the one or more communications devices in accordance with the mobility information for transmitting signals to the infrastructure equipment or receiving signals from the infrastructure equipment according to the mobility information.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma H. and Toskala A, "LTE for UMTS OFDMA and SC-FDMA based radio access", John Wiley and Sons, 2009.

What is claimed is:

1. A method of operating by a wireless communications device for transmitting or receiving via a wireless communications network, the method comprising:

receiving, from a non-stationary wireless base station of a radio network part of the wireless communications network, mobility information indicating a current location of the non-stationary wireless base station;

determining, by the wireless communications device, a location of the wireless communications device;

determining a relative bearing of the non-stationary wireless base station with respect to the wireless communications device based on the current location of the non-stationary wireless base station as determined from the mobility information received from the non-stationary wireless base station and the location of the wireless communications device as determined by the wireless communications device; and adapting an operation of the wireless communications device in accordance with the relative bearing, wherein the adapting comprises one or both of:

adapting a transmit beam selection by adapting a direction of transmitting a beam of signals according to the determined relative bearing, or adapting a receive beam selection by adapting a direction of receiving signals as a beam according to the determined relative bearing.

2. The method of claim 1, wherein the receiving the mobility information comprises transmitting, by the wireless communications device in a connected mode, a request for the mobility information, to the non-stationary wireless base station, and in response, receiving the mobility information.

3. The method of claim 2, wherein the transmitting the request comprises transmitting the request for the mobility information periodically, and the receiving the mobility information comprises receiving the mobility information periodically, the mobility information being updated in accordance with a time that the non-stationary wireless base station periodically transmits the mobility information.

4. The method of claim 1, wherein the receiving the mobility information comprises receiving the mobility information broadcast by the non-stationary wireless base station.

5. The method of claim 4, wherein the mobility information is broadcast in a system information block.

6. The method of claim 1, further comprising:

performing an idle mode selection/re-selection of one of a plurality of non-stationary wireless base stations forming a radio network part of the wireless communications network for receiving information from the wireless communications network, determining from the mobility information whether the wireless communications device can select or re-select the one of the plurality of non-stationary wireless base stations according to predetermined criteria, and adapting the idle mode selection/re-selection depending on whether the predetermined criteria determined that the one of the plurality of non-stationary wireless base stations should not be selected or re-selected.

7. The method of claim 6, wherein the mobility information provides an indication of whether the one of the plurality of non-stationary wireless base stations is non-stationary, and the predetermined criteria include not selecting or re-selecting the non-stationary wireless base station which is non-stationary.

8. The method of claim 6, wherein the mobility information indicates that the one of the plurality of non-stationary wireless base stations is non-stationary and provides information from which a speed of the non-stationary one of the plurality of non-stationary wireless base stations can be determined, and the predetermined criteria include not selecting or re-selecting the non-stationary wireless base station, which is moving at a speed which exceeds a predetermined threshold.

9. The method of claim 6, wherein the determining from the mobility information whether the wireless communications device can select or re-select the one of the plurality of non-stationary wireless base stations according to predetermined criteria comprises:

determining that the one of the plurality of non-stationary wireless base stations is not transmitting a System Information Block 1, SIB1, which includes radio resource configuration information or a schedule of other SIBs which would have been broadcast by the one of the plurality of non-stationary wireless base stations.

10. The method of claim 1, further comprising:

adapting a beam management procedure to measure received reference symbols from one or more received beam selected with a direction corresponding to the determined relative bearing.

11. The method of claim 10, wherein the adapting the beam management procedure comprises:

measuring channel state information reference symbols, CSI-RS, for one or more beams received in a direction determined from the relative bearing of the non-stationary wireless base station with respect to the wireless communications device, setting measurements associated with one or more beams received in a direction other than that determined from the relative bearing of the non-stationary wireless base station, and selecting, based on the measured CSI-RS, one of the beams.

12. A method of operating a wireless base station forming part of a wireless communications network, the method comprising:

determining a location of the wireless base station;

determining a location of one or more wireless communications devices;

selecting a recommended uplink beam index based on the location of the wireless base station as determined by the wireless base station and the location of the one or more wireless communications devices;

generating mobility information that includes the recommended uplink beam index and that indicates one or both of whether the wireless base station is non-stationary and the location of the wireless base station for use by the one or more wireless communications devices to adapt an operation of the one or more wireless communications devices in accordance with the mobility information for transmitting signals to the wireless base station or receiving signals from the wireless base station according to the mobility information; and transmitting, by the wireless base station to the one or more wireless communications devices, the mobility information including the recommended uplink beam index determined based upon the location of the base station as determined by the wireless base station.

13. The method of claim 12, wherein the mobility information includes one or more of the mobility status of the wireless base station, the location of the wireless base station, a velocity of the wireless base station, a moving direction of the wireless base station, a recommended transmission configuration indicator, TCI, state and a location of a neighbouring wireless base station.

14. The method of claim 12, comprising:

receiving as part of an adapted handover procedure from a wireless communications device an estimated distance between the wireless communications device and the wireless base station, or a location of the wireless communications device, and measurements of a received signal strength from a serving wireless base station and one or more neighbouring wireless base station as part of the adapted handover procedure for the wireless communications device, determining a target wireless base station for the wireless communications device based on the received signal strength measurements and a distance between the wireless communications device and the wireless base station determined from the location of the wireless communications device or the estimated distance received from the wireless communications device, and transmitting a handover instruction to handover to the target wireless base station determined by the wireless communications network from the received measurements combined with the distance.

15. The method of claim 12, wherein the mobility information provides an indication of the location of the wireless base station, and the method comprises:

transmitting signals as one or more of a plurality of beams of signals to a wireless communications device, receiving measurement information associated with measurements for one or more of the beams of signals received by the wireless communications device in a direction determined from a relative bearing of the wireless base station, the relative bearing being determined by the wireless communications device, and adapting the transmission of the signals by selecting one or more of the plurality of beams in accordance with the received measurement information.

16. A wireless communications device comprising:

transmitter circuitry configured to transmit signals via a wireless access interface of a wireless communications network, receiver circuitry configured to receive signals transmitted via the wireless communications network, and controller circuitry configured to control the transmitter circuitry and the receiver circuitry;

receive, from a non-stationary wireless base station of a radio network part of the wireless communications network, mobility information indicating a current location of the non-stationary wireless base station;

determine, by the wireless communications device, a location of the wireless communications device;

determine a relative bearing of the non-stationary wireless base station with respect to the wireless communications device based on the current location of the non-stationary wireless base station as determined from the mobility information received from the non-stationary wireless base station and the location of the wireless communications device as determined by the wireless communications device; and adapt the control of one or both of the transmitter circuitry and the receiver circuitry according to the determined relative bearing by adapting a transmit beam selection to be in a direction of transmitting a transmit beam of signals according to the determined relative bearing, or adapting a receive beam selection to be in a direction of receiving signals as a receive beam according to the determined relative bearing.

17. The wireless communications device of claim 16, wherein the controller circuitry is configured to:

perform an idle mode selection/re-selection of one of a plurality of non-stationary wireless base stations forming a radio network part of the wireless communications network for receiving information from the wireless communications network, determine from the mobility information whether the wireless communications device can select or re-select the one of the plurality of non-stationary wireless base stations according to predetermined criteria, and adapt the idle mode selection/re-selection depending on whether the predetermined criteria determined that the one of the plurality of non-stationary wireless base stations should not be selected or re-selected.

18. The wireless communications device of claim 16, wherein the controller circuitry is configured to:

determine a distance between the wireless communications device and the non-stationary wireless base station based on the location of the non-stationary wireless base station provided by the mobility information and the determined location of the wireless communications device, and adapt the control of the receiver circuitry by performing measurements of received signal strength from a serving non-stationary wireless base station and one or more neighbouring non-stationary wireless base station as part of a handover procedure, the non-stationary wireless base station being one of the serving non-stationary wireless base station or one of the one or more neighbouring non-stationary wireless base station, and adapting the handover procedure based on the distance between the wireless communications device and the non-stationary wireless base station and the measurements of the received signal strength for the wireless communications device to handover to one of the one or more neighbouring non-stationary wireless base station as a target for handover or to remain on the serving non-stationary wireless base station.

* * * * *